United States Patent
Kenjyo et al.

(10) Patent No.: US 9,395,227 B2
(45) Date of Patent: Jul. 19, 2016

(54) REACTOR WATER-LEVEL MEASUREMENT SYSTEM

(71) Applicant: KABUSHIKI KAISHA TOSHIBA, Minato-Ku (JP)

(72) Inventors: Hiroaki Kenjyo, Fujisawa (JP); Yasushi Goto, Yokohama (JP); Toshiaki Ito, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 166 days.

(21) Appl. No.: 14/359,965

(22) PCT Filed: Nov. 21, 2012

(86) PCT No.: PCT/JP2012/080145
§ 371 (c)(1),
(2) Date: May 22, 2014

(87) PCT Pub. No.: WO2013/077349
PCT Pub. Date: May 30, 2013

(65) Prior Publication Data
US 2014/0318237 A1     Oct. 30, 2014

(30) Foreign Application Priority Data
Nov. 22, 2011  (JP) .................................. 2011-255354

(51) Int. Cl.
*G21C 17/022*     (2006.01)
*G01F 23/24*      (2006.01)
(Continued)

(52) U.S. Cl.
CPC ............ *G01F 23/246* (2013.01); *G21C 17/035* (2013.01); *G21C 17/112* (2013.01)

(58) Field of Classification Search
CPC ............................ G21C 17/035; G21C 17/112
See application file for complete search history.

(56) References Cited

U.S. PATENT DOCUMENTS

| | | | | |
|---|---|---|---|---|
| 4,418,035 | A * | 11/1983 | Smith | G01F 23/22 376/247 |
| 4,592,230 | A * | 6/1986 | Waring | G21C 17/035 376/258 |
| 2008/0310576 | A1 * | 12/2008 | Brisson | G01F 1/6888 376/258 |

FOREIGN PATENT DOCUMENTS

| | | |
|---|---|---|
| JP | 56-46429 | 4/1981 |
| JP | 57-521 | 1/1982 |

(Continued)

OTHER PUBLICATIONS

International Preliminary Report on Patentability and Written Opinion issued May 27, 2014, in International Application No. PCT/JP2012/080145 (English translation).

(Continued)

*Primary Examiner* — Daniel S Larkin
*Assistant Examiner* — Alex Devito
(74) *Attorney, Agent, or Firm* — Oblon, McClelland, Maier & Neustadt, L.L.P (57) ABSTRACT

It is provided with a reactor water-level measurement system being possible to measure water-level in a reactor core regardless of a state in the reactor core. The reactor water-level measurement system includes a core bottom water-level measuring device that includes a heating element, a heat insulating element installed by surrounding part of the heating element in a height direction of the heating element, and a temperature difference measuring element that measures a temperature difference between an insulated portion of the heating element surrounded by the heat insulating element and a non-insulated portion not surrounded by the heat insulating element, a water-level evaluation device that evaluates a water level of a reactor based on the temperature difference, wherein the core bottom water-level measuring device measures at least a water level from a lower end of a reactor core contained in a reactor pressure vessel to a bottom of the reactor pressure vessel.

9 Claims, 8 Drawing Sheets

(51) Int. Cl.
*G21C 17/035* (2006.01)
*G21C 17/112* (2006.01)

(56) References Cited

FOREIGN PATENT DOCUMENTS

| | | |
|---|---|---|
| JP | 59-46818 | 3/1984 |
| JP | 61-102593 | 5/1986 |
| JP | 4-64098 | 2/1992 |
| JP | 10-39083 | 2/1998 |

OTHER PUBLICATIONS

International Search Report issued Feb. 19, 2013, in PCT/JP2012/080145, filed Nov. 21, 2012.
"Tokyo Denryoku Fukushima Daiichi Genshiryoku Hatsudensho 1 Goki no Roshin Jotai ni Tsuite", The Tokyo Electric Power Co., Inc., http://www.tepco.co.jp/cc/press/betu11_j/images/110515k.pdf, May 15, 2011, 6 pages.

\* cited by examiner

REACTOR WATER-LEVEL MEASUREMENT SYSTEM

TECHNICAL FIELD

The present invention relates to a reactor water-level measurement system that measures the water level in a reactor.

BACKGROUND ART

For boiling-water nuclear power plants (BWR power plants), some water-level meters for use to monitor water levels in a reactor have been proposed. For example, a monitoring apparatus for measuring a water level in a reactor core has been proposed (e.g., Patent Document 1). The monitoring apparatus described in Patent Document 1 is configured to use gamma-ray heating in a reactor, insert a sensor structured by combining a thermocouple and stainless steel rod into the reactor, and continuously monitor the reactor water level by detecting an AC component and DC component of output.

PRIOR ART DOCUMENTS

Patent Document

Patent Document 1: Japanese Patent Application Laid-open Publication No. Heisei 10-39083

DESCRIPTION OF THE INVENTION

Problems to be Solved by the Invention

The monitoring apparatus described in Patent Document 1 is intended for water-level evaluation when cooling water is located in the reactor core. Therefore, if the water level in the reactor is lower than the reactor core, the monitoring apparatus described in Patent Document 1 cannot monitor the water-level.

Further, if the water level in the reactor falls extremely, the water-level meter installed in a neighborhood of the reactor core is heated by fuel and might therefore fail to normally operate. Furthermore, if abnormal heating of the reactor core induces a high-temperature falling object or a situation such as core damage, fuel melting, or penetration of a reactor bottom by molten fuel, a reactor water-level measurement system might be damaged by the falling object, and therefore result in failure to operate normally.

The present invention has been made in view of the above circumstances and has an object to provide a reactor water-level measurement system capable of measuring the water level of a reactor regardless of conditions in the reactor.

Means for Solving the Problems

To solve the above problem, the present invention provides a reactor water-level measurement system comprising: a core bottom water-level measuring device that includes a heating element, a heat insulating element installed by surrounding part of the heating element in a height direction of the heating element, and a temperature difference measuring element that measures a temperature difference between an insulated portion of the heating element surrounded by the heat insulating element and a non-insulated portion not surrounded by the heat insulating element; a water-level evaluation device that evaluates a water level of a reactor based on the temperature difference, wherein the core bottom water-level measuring device measures at least a water level from a lower end of a reactor core contained in a reactor pressure vessel to a bottom of the reactor pressure vessel.

Effect of the Invention

The reactor water-level measurement system according to the present invention can measure the water level of a reactor regardless of conditions in the reactor.

EMBODIMENTS FOR CARRYING OUT THE INVENTION

Embodiments of a reactor water-level measurement system according to the present invention will be described with reference to the accompanying drawings. It is noted that the reactor water-level measurement system according to the present invention is applied to a boiling-water reactor (BWR) in each of the embodiments described below.

First Embodiment

Figure 1:
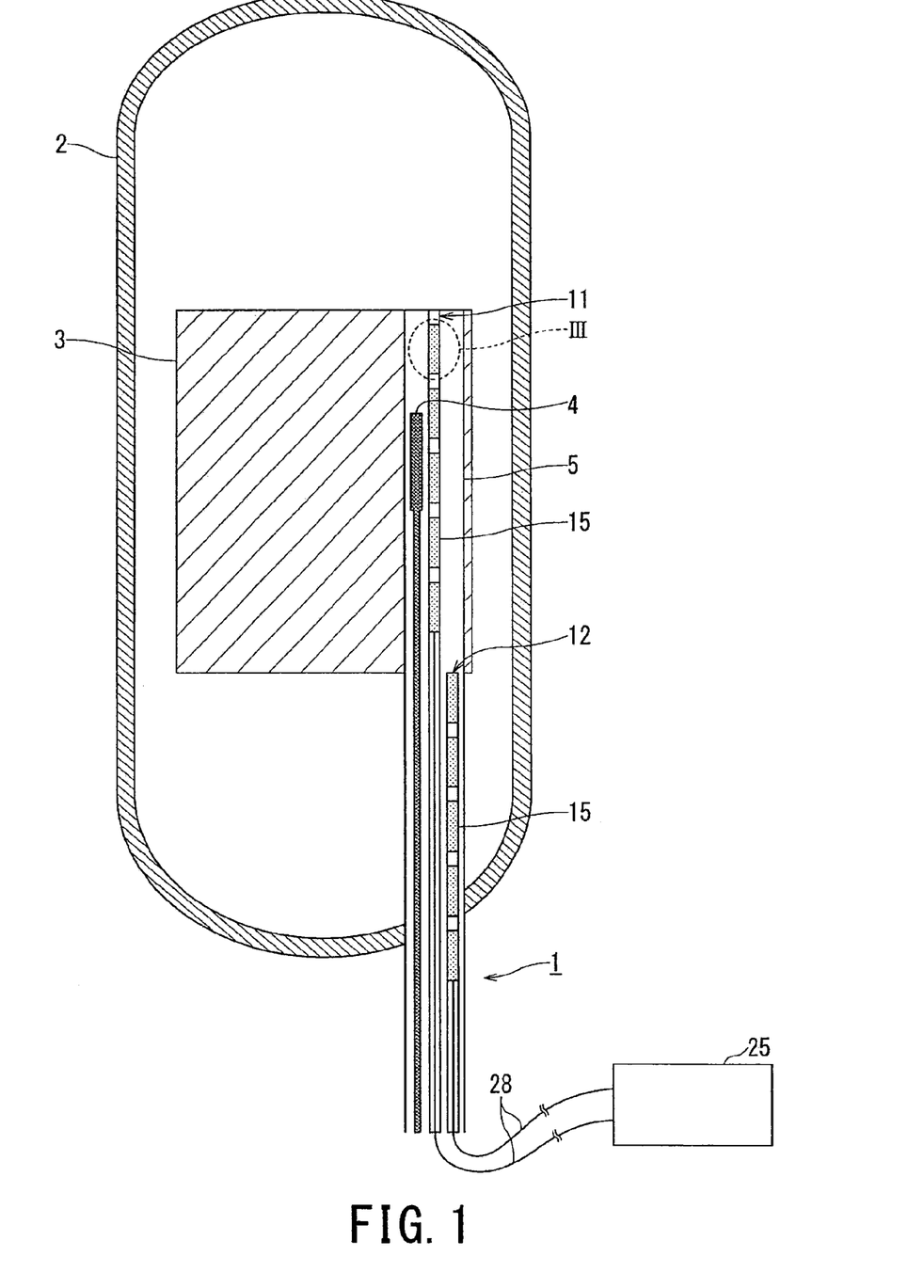
FIG. 1 is a schematic sectional view illustrating a structure of a reactor water-level measurement system according to a first embodiment.

FIG. 1 is a schematic sectional view illustrating a configuration of a reactor water-level measurement system 1 according to a first embodiment.

The reactor water-level measurement system (water-level measurement system) 1 includes in-core water-level measuring devices 11 and core bottom water-level measuring devices 12.

The in-core water-level measuring device 11 and the core bottom water-level measuring device 12 (which will be merely referred to as "water-level measuring devices 11 and 12" if it is not necessary to distinguish the in-core water-level measuring device 11 from the core bottom water-level measuring device 12) are contained, together with a neutron detector 4, in a protective tube 5 of the neutron detector 4 that monitors neutron fluxes in a reactor core. The protective tube 5 is arranged in the reactor core 3, penetrating a bottom of the reactor pressure vessel (pressure vessel) 2. Since a lower end of the protective tube 5 can be opened, the water-level measuring devices 11 and 12 can be taken in and out of the protective tube 5 as required.

The in-core water-level measuring devices 11 are installed within a vertical range of the reactor core 3 to measure a water level in the reactor core 3 along a vertical direction. The core bottom water-level measuring devices 12 are installed running from a lower end of the reactor core 3 to a bottom of the pressure vessel 2 to measure at least the water level in the vertical direction from the lower end of the reactor core 3 to the bottom of the pressure vessel 2. In the first embodiment, the core bottom water-level measuring devices 12 are placed in the vertical direction from the lower end of the reactor core 3 to the outer side below the pressure vessel 2 for the sake of measuring the water level in a range from the lower end of the reactor core 3 to the bottom of the pressure vessel 2 to an outer side below the pressure vessel 2.

The water-level measuring devices 11 and 12 are placed in an outer peripheral portion of the reactor core 3 (in the protective tubes 5 placed in the outer peripheral portion of the reactor core 3). Further, the water-level measuring devices 11 and 12 are placed so as to cover two or four different sections (obtained by dividing an area inside the reactor into monitoring zones) of the reactor core 3.

Figure 2:
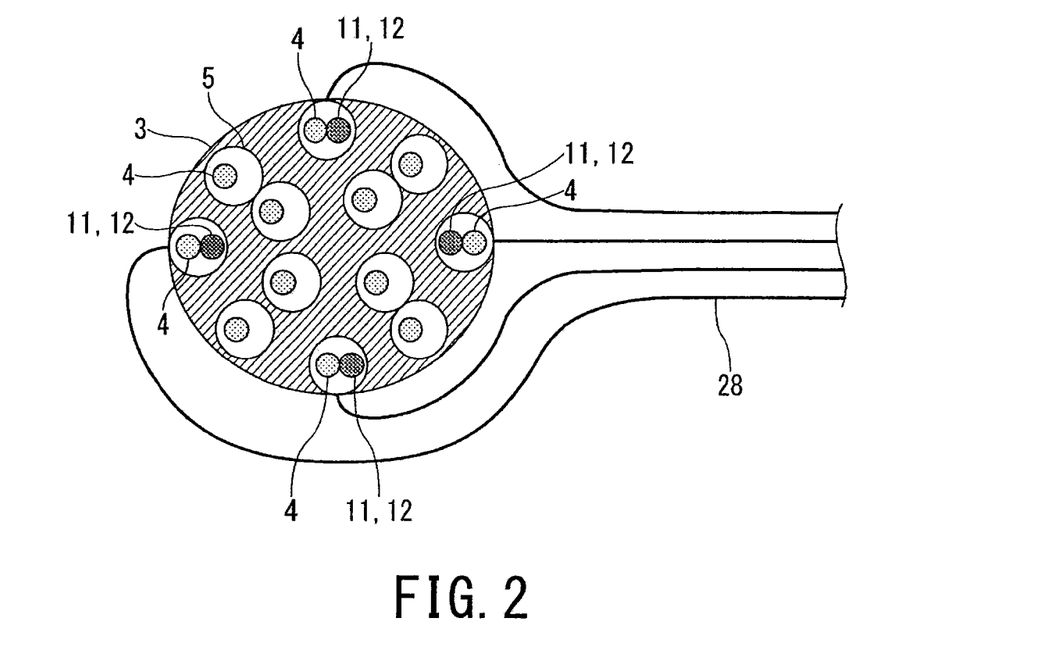
FIG. 2 is a schematic plan view illustrating a layout example of in-core water-level measuring devices and core bottom water-level measuring devices, in a reactor core.

FIG. 2 is a plan view illustrating a layout example of the in-core water-level measuring devices 11 and the core bottom water-level measuring devices 12, in the reactor core 3.

The water-level measuring devices 11 and 12 are placed along an outer periphery of the reactor core 3 so as to cover, for example, four sections. Consequently, if a single failure occurs in the water-level measurement system 1 (the water-level measuring devices 11 and 12) or a single failure of a power supply system occurs in a same section, water levels can be measured in remaining three sections (or remaining one section if two sections are covered).

Figure 3:
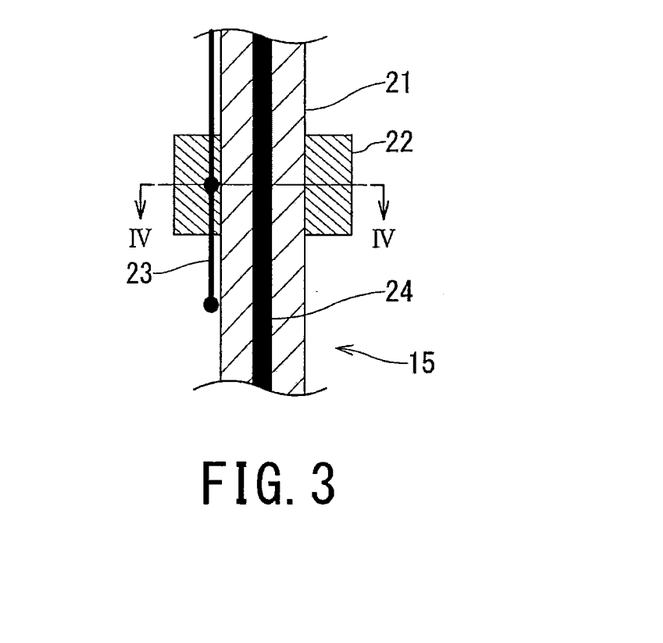
FIG. 3 is an enlarged view of a measuring unit in region III illustrated in FIG. 1.

FIG. 3 is an enlarged view of a measuring unit 15 in region III illustrated in FIG. 1.

Figure 4:
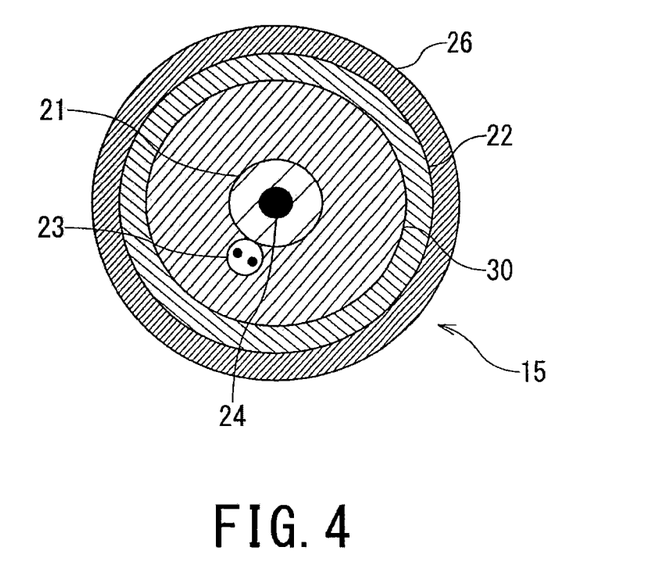
FIG. 4 is a horizontal sectional view along line IV-IV illustrated in FIG. 3.

FIG. 4 is a horizontal sectional view along line IV-IV illustrated in FIG. 3.

The water-level measuring devices 11 and 12 include the measuring units 15 that configure a common configuration. As illustrated in FIGS. 3 and 4, the measuring unit 15 includes a heating element 21, a heat insulating element 22, a temperature difference measuring element 23, and a heater 24.

The heating element 21 is a rodlike member extending in the vertical direction within a water-level measuring range. The heating element 21 is a member that generates heat when irradiated with gamma rays from the reactor core 3 or when heated by the heater 24, and is formed for example, of stainless steel. The heat insulating element 22 is a cylindrical member in which, for example, argon gas is enclosed and which is installed by surrounding part of the heating element 21 in a height direction of the heating element 21 to keep the heating element 21 from releasing heat to surroundings of the heating element 21.

The temperature difference measuring element 23 measures a temperature difference between an insulated portion of the heating element 21 surrounded by the heat insulating element 22 and a non-insulated portion not surrounded by the heat insulating element 22. The temperature difference measuring element 23 is, for example, a pair of thermocouples, a pair of resistance temperature detectors, or a differential thermocouple having a contact point in each of the insulated portion and non-insulated portion.

The heater 24 heats the heating element 21 by being installed, for example, inside and along the heating element 21. It is only necessary that the heater 24 can heat the heat insulating element 22 and a neighborhood of the temperature difference measuring element 23. Accordingly, in other portions, the heater 24 may be a conductor other than a heater wire which generates heat.

The heating element 21, the heat insulating element 22, the temperature difference measuring element 23, and the heater 24 are contained in a protective tube 26 filled with an insulator (non-conductor) 30. Incidentally, the insulator 30 and the protective tube 26 are omitted (not illustrated) in FIG. 3.

A water-level evaluation device 25 illustrated in FIG. 1 is connected to the heater 24 and passes a required current through the heater 24. Further, the water-level evaluation device 25 is connected to the temperature difference measuring element 23 via a signal line 28, and obtains data of temperature difference between the insulated portion and non-insulated portion, measured by the temperature difference measuring element 23. The water-level evaluation device 25 holds temperature difference data taken beforehand when the temperature difference measuring element 23 is surrounded by a coolant (reactor water) and when the temperature difference measuring element 23 is surrounded by air. The water-level evaluation device 25 compares the temperature difference data obtained from the temperature difference measuring element 23 with the temperature difference data which is held in advance, and evaluates whether the temperature difference measuring element 23 is surrounded by a coolant or air.

The signal line 28 transmits the temperature difference data obtained from the temperature difference measuring element 23 to outside the pressure vessel 2. Preferably, the signal line 28 is laid at appropriate locations by considering cases in which the bottom of the pressure vessel 2 is damaged by molten fuel or a molten fuel drops into a reactor containment vessel that contains the pressure vessel 2. For example, the signal line 28 is laid so as not to pass a bottom center of the pressure vessel 2.

Next, operation of the water-level measurement system 1 according to the first embodiment will be described.

Generally, the BWR includes the neutron detector 4 that is used for neutron monitoring of the reactor core 3, and the protective tube 5. Thus, in the water-level measurement system 1, the water-level measuring devices 11 and 12 are installed in the protective tube 5 whereby it is unnecessary to make structural changes to the pressure vessel 2, the reactor core 3, and a shroud surrounding the reactor core 3 even if the water-level measurement system 1 is installed.

If gamma rays are emitted from the reactor core 3 during reactor (running) operation, the heating element 21 generates heat. Heat quantity of the heating element 21 is reduced through heat removal by the coolant or air around the heat insulating element 22 (around the protective tube 26). On the other hand, being surrounded by the heat insulating element 22, the insulated portion of the heating element 21 does not undergo heat removal by the coolant or air unlike the non-insulated portion, and thus maintains a hotter state than the non-insulated portion. Heat quantity of the non-insulated portion is gradually heat-transferred upward and downward without undergoing heat removal by the coolant or air.

Here, the coolant has higher heat removal capacity (higher thermal conductivity) than air. Consequently, the non-insulated portion is lower in temperature when the temperature difference measuring element 23 is surrounded by the coolant than when the temperature difference measuring element 23 is surrounded by air. Therefore, the temperature difference between the insulated portion and non-insulated portion is larger in the coolant than in air.

The water-level evaluation device 25 compares newly obtained temperature difference data with temperature difference data held since before, and evaluates whether the temperature difference measuring element 23 is surrounded by the coolant, i.e., whether the water level of the coolant is higher or lower than the temperature difference measuring element 23.

If output from the reactor core 3 is low, there may be a case where a required temperature difference is not obtained by the temperature difference measuring element 23 due to insufficient amount of gamma rays. In this case, the water-level measurement system 1 heats the heating element 21 by the heater 24 instead of gamma rays. The water-level measurement system 1 can measure the water level of the coolant as is the case with a case where the water-level measurement system 1 heats the heating element 21 by using gamma rays.

The water-level measurement system 1 according to the first embodiment has the core bottom water-level measuring device 12 to measure the water level below the lower end of the reactor core 3. Therefore, the water-level measurement system 1 can monitor the water level in the vertical direction from the reactor core 3 to the bottom of the pressure vessel 2.

Figure 5:
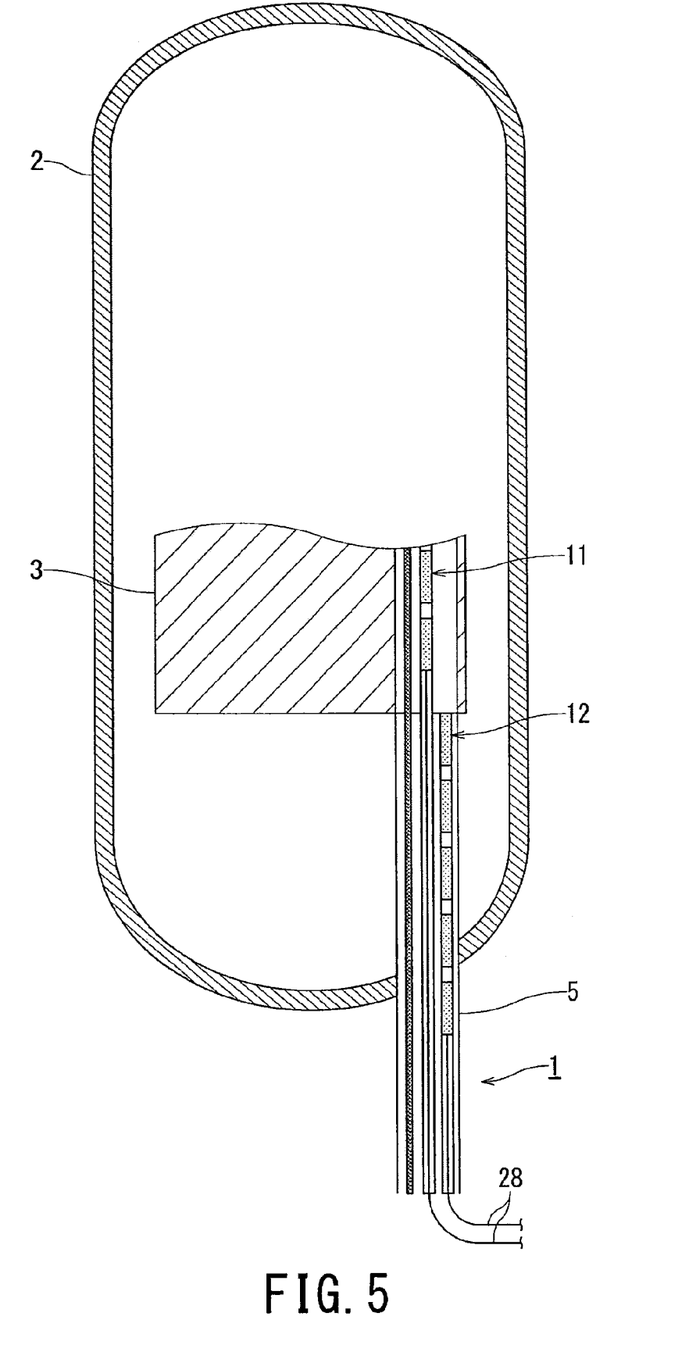
FIG. 5 is an explanatory diagram illustrating a case in which part of the reactor core is damaged (fuel melting), the case damaging in-core water-level measuring devices.

For example, as illustrated in FIG. 5, if part of the reactor core is damaged (fuel melting), the in-core water-level measuring device 11 would be melted at the same time, which would result in loss of a monitoring function. In contrast, the core bottom water-level measuring device 12 is installed independently of the in-core water-level measuring device 11, and therefore possible to monitor the water level continuously when the pressure vessel 2 contains the coolant.

Since the outer peripheral portion of the reactor core 3 is lower in fuel density and temperature than a central portion, the in-core water-level measuring device 11 is placed in an outermost periphery of the reactor core 3. Consequently, the water-level measurement system 1 would not have the in-core water-level measuring device 11 damaged even if fuel melting in the central portion of the reactor core 3 is partially occurred.

The water-level measurement system 1 can continuously measure the water level of the coolant in the pressure vessel 2 using a simple configuration under a condition where the water level in the pressure vessel 2 falls extremely as well as under normal condition.

Further, since the water-level measuring devices 11 and 12 are contained in the protective tubes 5 of the existing neutron detector 4 previously provided to the BWR, there is no necessity to additionally install new components in the pressure vessel 2 when the water-level measurement system 1 is installed. Therefore, the water-level measurement system 1 can reduce processes of work for installation and amounts of work for installation.

Further, in the water-level measurement system 1, the in-core water-level measuring device 11 and the core bottom water-level measuring device 12 are installed independently of each other. Consequently, even if part of the reactor core 3 is damaged (fuel melting) whereby the in-core water-level measuring device 11 is damaged, the core bottom water-level measuring device 12 can evaluate the water level.

Namely, in the example described above, although the in-core water-level measuring devices 11 and the core bottom water-level measuring devices 12 according to the first embodiment are contained in common protective tubes 5, the in-core water-level measuring devices 11 and the core bottom water-level measuring devices 12 may be contained in different protective tubes 5 or may not be contained in protective tubes 5.

Second Embodiment

Figure 6:
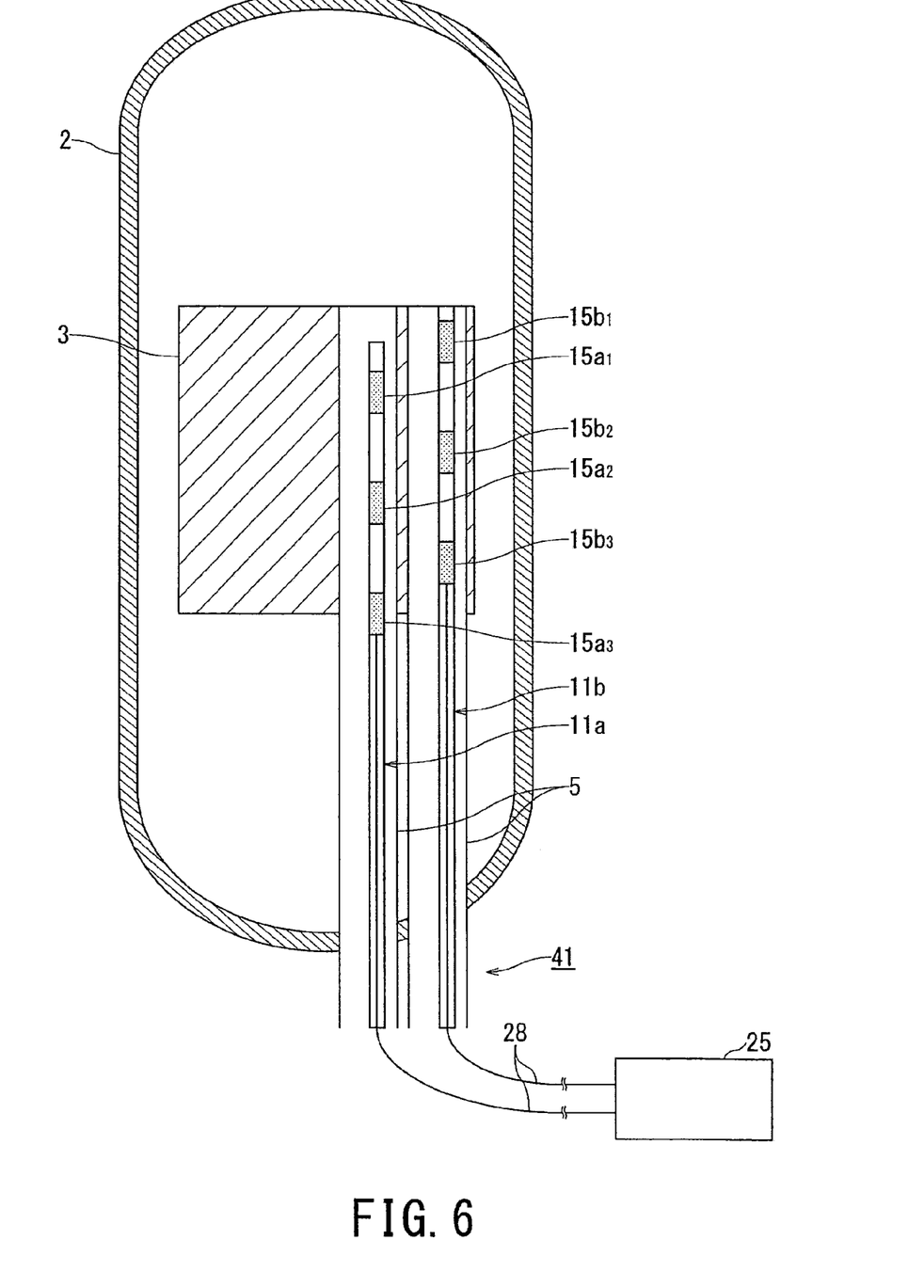
FIG. 6 is a schematic sectional view illustrating a structure of a reactor water-level measurement system according to a second embodiment.

FIG. 6 is a configuration diagram of a reactor water-level measurement system 41 according to a second embodiment.

The reactor water-level measurement system (water-level measurement system) 41 according to the second embodiment differs from the water-level measurement system 1 according to the first embodiment in that plural in-core water-level measuring devices 11 as well as plural core bottom water-level measuring devices 12 are installed with vertical positions of the measuring units 15 differing from one another. Therefore, in the reactor water-level measurement system 41 according to the second embodiment, components or parts corresponding to those of the first embodiment are denoted by the same reference numerals as the corresponding components or parts of the first embodiment or omitted from illustration, and duplicated description thereof will be omitted.

Plural in-core water-level measuring devices 11*a* and 11*b* are provided (only two of them are illustrated in FIG. 6 for convenience of explanation). The measuring units 15 are installed in the plural in-core water-level measuring devices 11*a* and 11*b* at locations differing in the vertical direction between the in-core water-level measuring devices 11*a* and 11*b*. That is, measuring units $15a_1$, $15a_2$, and $15a_3$ of the in-core water-level measuring device 11*a* and measuring units $15b_1$, $15b_2$, and $15b_3$ of the in-core water-level measuring device 11*b* are provided so as to differ in the water-level measuring range.

Incidentally, although illustrations of the core bottom water-level measuring device 12 and neutron detector 4 are omitted in FIG. 6 for convenience of explanation (this omission is also applied in a third embodiment described later), plural core bottom water-level measuring devices 12 are provided as with the in-core water-level measuring devices 11*a* and 11*b* and measuring units 15 are installed at locations differing in the vertical direction among the core bottom water-level measuring devices 12.

Next, operation of the water-level measurement system 41 according to the second embodiment will be described.

Figure 7:
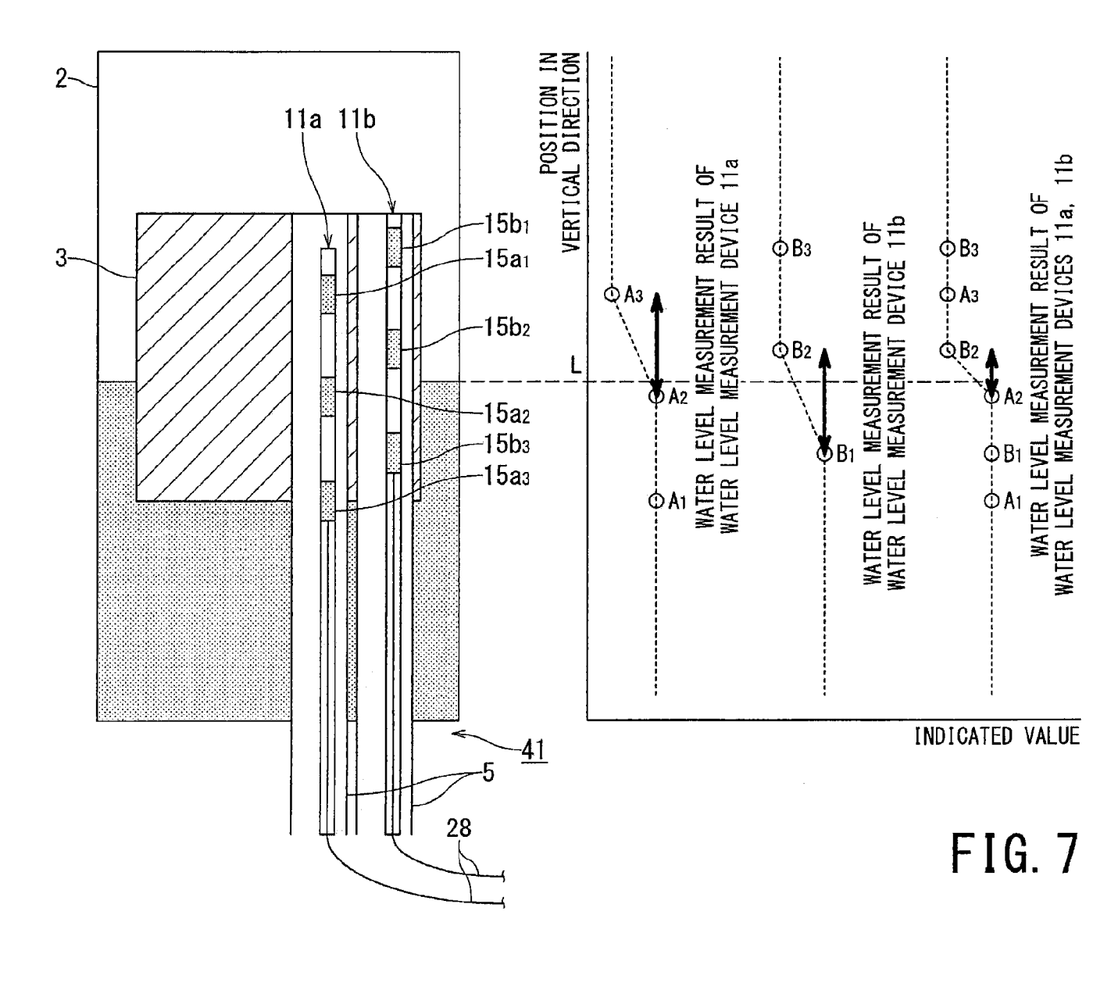
FIG. 7 is an explanatory diagram for illustrating a measuring range of the reactor water-level measurement system according to the second embodiment.

FIG. 7 is an explanatory diagram for illustrating a measuring range of the water-level measurement system 41 according to the second embodiment.

The number of measuring units 15 which can be installed on a single in-core water-level measuring device 11 is physically limited and a range of identifiable water levels depends on the number of measuring units 15. On the other hand, the water-level measurement system 41 according to the second embodiment can improve water-level detection accuracy by installing plural in-core water-level measuring devices 11*a* and 11*b* with vertical positions of the measuring units 15 differing between the in-core water-level measuring devices 11*a* and 11*b*.

Referring to FIG. 7, specifically, the water-level measurement system 41 measures temperature differences at a height $A_1$, a height $A_2$, and a height $A_3$ in the vertical direction using the measuring units $15a_1$, $15a_2$, and $15a_3$ of the in-core water-level measuring device 11*a*. Since the reactor water is currently at a water level L, the in-core water-level measuring device 11*a* detects that the water level L of the reactor water is between the height $A_2$ and the height $A_3$, based on measurement results produced by the measuring units $15a_1$, $15a_2$, and $15a_3$.

Further, the water-level measurement system 41 measures temperature differences at a height $B_1$, a height $B_2$, and a height $B_3$ in the vertical direction using the measuring units $15b_1$, $15b_2$, and $15b_3$ of the in-core water-level measuring device 11b. Similarly, the in-core water-level measuring device 11b detects that the water level L of the reactor water is between the height $B_1$ and height $B_2$, based on measurement results measured by the measuring units $15b_1$, $15b_2$, and $15b_3$.

Based on results detected by the in-core water-level measuring devices 11a and 11b, the water-level measurement system 41 recognizes that the water level L is in a range between the height $A_2$ and height $B_2$, which is an overlapping range of the in-core water-level measuring devices 11a and 11b.

As described above, by superimposing the water levels calculated by the plural in-core water-level measuring devices 11 and the core bottom water-level measuring devices 12, the water-level measurement system 41 according to the second embodiment can improve the water-level detection accuracy without changing structures of the individual water-level measuring devices 11 and 12.

Third Embodiment

Figure 8:
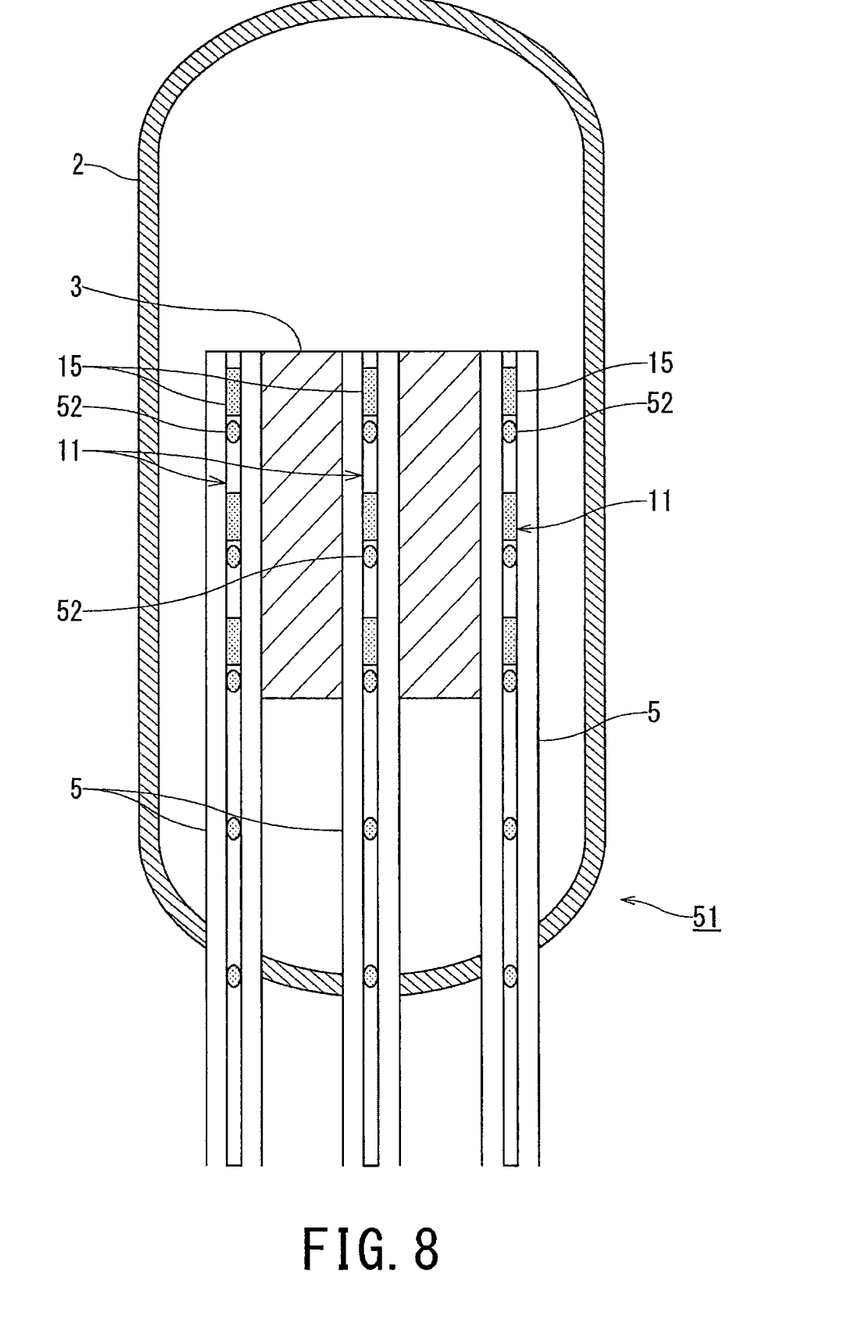
FIG. 8 is a schematic sectional view illustrating a structure of a reactor water-level measurement system according to a third embodiment.

FIG. 8 is a configuration diagram of a reactor water-level measurement system 51 according to a third embodiment.

Figure 9:
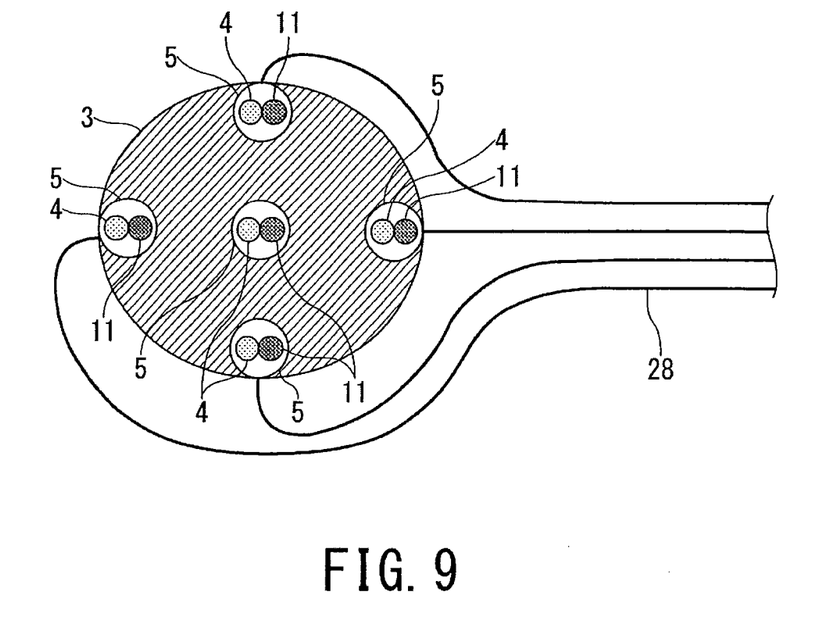
FIG. 9 is a schematic plan view illustrating a layout example of in-core water-level measuring devices according to the third embodiment in a reactor core.

FIG. 9 is a plan view illustrating a layout example of the in-core water-level measuring devices 11 according to the third embodiment in the reactor core 3.

The reactor water-level measurement system (water-level measurement system) 51 according to the third embodiment differs from the water-level measurement system 1 according to the first embodiment in that the in-core water-level measuring device 11 and the core bottom water-level measuring device 12 further include temperature measuring devices. Therefore, in the water-level measurement system 51 according to the third embodiment, components or parts corresponding to those of the first embodiment are denoted by the same reference numerals as the corresponding components or parts of the first embodiment or omitted from illustration, and duplicated description thereof will be omitted.

The in-core water-level measuring device 11 includes a temperature measuring device 52, for example, inside or outside the reactor core 3. The temperature measuring device 52 is configured to being capable of measuring temperatures inside or outside the pressure vessel 2. Plural temperature measuring devices 52 are installed, for example, at positions different from the measuring units 15, running vertically from within a region of the reactor core 3 to lower part of the pressure vessel 2 in the reactor core 3 to the outer side below the pressure vessel 2.

As illustrated in FIG. 9, the in-core water-level measuring devices 11 are arranged horizontally in a center of the reactor core 3 and on the outer periphery of the reactor core 3.

Because the in-core water-level measuring device 11 includes a temperature measuring device 52, the water-level measurement system 51 according to the third embodiment measures not only the reactor water level, but also the reactor core 3 temperature which indicates a cooled state of fuel. Based on the measured temperature by the temperature measuring device 52, the water-level measurement system 51 can monitor whether the fuel reaches a temperature limit, i.e., the melting point of the fuel.

Further, in the water-level measurement system 51, since the in-core water-level measuring devices 11 equipped with the temperature measuring devices 52 are installed in the central portion and outer peripheral portion of the reactor core 3, a three-dimensional temperature distribution of the fuel can be monitored together with signals provided from the measuring units 15. Therefore, the water-level measurement system 51 can estimate a region where the fuel is likely to melt.

Furthermore, in the water-level measurement system 51, since plural temperature measuring devices 52 are installed running vertically from within a region of the reactor core 3 to lower part of the pressure vessel 2 in the reactor core 3 to the outer side below the pressure vessel 2, the water-level measurement system 51 can acquire behavior of the high-temperature molten fuel.

Specifically, the water-level measurement system 51 can monitor downward movements of the molten fuel to lower part of the pressure vessel 2 by using the temperature measuring devices 52 installed running vertically from within a region of the reactor core 3 to lower part of the pressure vessel 2 in the reactor core 3 to the outer side below the pressure vessel 2, and can therefore estimate position of the moving molten fuel. Further, if molten fuel damages the bottom of the pressure vessel 2 and/or flows out into the reactor containment vessel of the molten fuel, the water-level measurement system 51 can check whether the bottom of the pressure vessel 2 is damaged or not by means of the temperature measuring devices 52 placed in regions outside the pressure vessel 2.

Whereas some embodiments of the present invention have been described, these embodiments are merely presented as example, and not intended to limit the scope of the invention. These novel embodiments can be implemented in various other forms, and various omissions, replacements, and changes can be made without departing from the spirit of the invention. These embodiments and modifications thereof are included within the sprit and scope of the invention and are included within the scope of the invention as described in the claims and equivalents thereof.

For example, another type of water-level measuring device such as a differential pressure water-level meter may be used for the in-core water-level measuring device 11.

Further, the water-level measuring devices 11 and 12 may include temperature measuring devices instead of the temperature difference measuring devices 23 and may measure the water level by measuring temperature differences among the plural temperature measuring devices.

REFERENCE NUMERALS 1, 41, 51 - - - reactor water-level measurement system
2 - - - pressure vessel
3 - - - reactor core
4 - - - neutron detector
5 - - - protective tube
11, 11a, 11b - - - in-core water-level measuring device
12 - - - core bottom water-level measuring device
15, $15a_1$-$15a_3$, $15b_1$-$15b_3$ - - - measuring unit
52 - - - temperature measuring device

The invention claimed is:
1. A reactor water-level measurement system comprising:
a core bottom water-level measuring device that includes a heating element, a heat insulating element installed by surrounding part of the heating element in a height direction of the heating element, and a temperature difference measuring element that measures a temperature difference between an insulated portion of the heating element surrounded by the heat insulating element and a non-insulated portion not surrounded by the heat insulating element;
a water-level evaluation device that evaluates a water level of a reactor based on the temperature difference, wherein the core bottom water-level measuring device measures at least a water level from a lower end of a reactor core contained in a reactor pressure vessel to a bottom of the reactor pressure vessel, and wherein the reactor pressure vessel includes a neutron detector that monitors neutron fluxes in the reactor core and a protective tube that contains the neutron detector, and wherein the core bottom water-level measuring device is contained in the protective tube together with the neutron detector.

2. The reactor water-level measurement system according to claim 1, further comprising an in-core water-level measuring device that includes a heating element, a heat insulating element installed by surrounding part of the heating element in a height direction of the heating element, and a temperature difference measuring element that measures a temperature difference between an insulated portion of the heating element surrounded by the heat insulating element and a non-insulated portion not surrounded by the heat insulating element, and measures a water level within a vertical range of the reactor core.

3. The reactor water-level measurement system according to claim 2, wherein the in-core water-level measuring device is contained in the same protective tube together with the neutron detector.

4. The reactor water-level measurement system according to claim 1, wherein the core bottom water-level measuring device is arranged in an outer peripheral portion of the reactor core.

5. The reactor water-level measurement system according to claim 1, wherein a plurality of the core bottom water-level measuring devices are arranged in different sections obtained by dividing an area inside the reactor core into monitoring zones.

6. The reactor water-level measurement system according to claim 2, wherein one of both the a plurality of the core bottom water-level measuring devices and a plurality of the in-core water-level measuring devices are installed, and wherein one of both the temperature difference measuring elements of the core bottom water-level measuring devices and the temperature difference measuring elements of the in-core water-level measuring devices are respectively installed in a vertical direction at locations differing among the water-level measuring devices.

7. The reactor water-level measurement system according to claim 2, wherein one of both the core bottom water-level measuring device and the in-core water-level measuring device further includes a temperature measuring device that measures temperatures.

8. The reactor water-level measurement system according to claim 7, wherein the temperature measuring device measures temperatures at a plurality of locations along a vertical direction in the reactor.

9. The reactor water-level measurement system according to claim 7, wherein the temperature measuring device is arranged in a horizontal central portion of the reactor core.

* * * * *